(12) United States Patent
Tohji et al.

(10) Patent No.: US 7,704,914 B2
(45) Date of Patent: Apr. 27, 2010

(54) PHOTOCATALYST AND PROCESS FOR PRODUCING THE SAME

(75) Inventors: Kazuyuki Tohji, Sendai (JP); Akira Kishimoto, Nishitama-gun (JP); Takafumi Atarashi, Nishitama-gun (JP)

(73) Assignees: Nittetsu Mining Co., Ltd., Tokyo (JP); Japan Sience and Technology Agency, Saitama (JP)

( * ) Notice: Subject to any disclaimer, the term of this patent is extended or adjusted under 35 U.S.C. 154(b) by 617 days.

(21) Appl. No.: 10/507,895

(22) PCT Filed: Aug. 23, 2002

(86) PCT No.: PCT/JP02/08531
§ 371 (c)(1),
(2), (4) Date: Sep. 17, 2004

(87) PCT Pub. No.: WO03/078061
PCT Pub. Date: Sep. 25, 2003

(65) Prior Publication Data
US 2005/0181942 A1    Aug. 18, 2005

(30) Foreign Application Priority Data
Mar. 18, 2002 (JP) .............................. 2002-074458

(51) Int. Cl.
| | |
|---|---|
| B01J 27/02 | (2006.01) |
| B01J 27/045 | (2006.01) |
| B01J 23/58 | (2006.01) |
| B01J 23/02 | (2006.01) |
| B01J 23/06 | (2006.01) |
| C01G 9/08 | (2006.01) |
| C01G 11/02 | (2006.01) |
| C01G 13/00 | (2006.01) |
| C09K 11/54 | (2006.01) |
| C09K 11/56 | (2006.01) |
| C09K 11/70 | (2006.01) |
| C09K 11/72 | (2006.01) |
| C09K 11/77 | (2006.01) |
| H01C 13/00 | (2006.01) |
| C09B 67/00 | (2006.01) |
| H01B 1/22 | (2006.01) |
| H01B 1/02 | (2006.01) |
| H01B 1/08 | (2006.01) |

(52) U.S. Cl. ........................ 502/216; 502/233; 502/328; 502/340; 423/566.1; 252/501.1; 252/514; 252/519.1; 252/518.1; 252/521.6; 252/519.4; 252/301.6 R; 252/301.6 S

(58) Field of Classification Search ................. 502/216, 502/233, 328, 340; 423/566.1; 252/501.1, 252/514, 519.1, 518.1, 521.6, 519.4, 301.6 R, 252/301.6 S
See application file for complete search history.

(56) References Cited

U.S. PATENT DOCUMENTS 4,041,140 A * 8/1977 Nitta et al. ................... 264/643
(Continued)

FOREIGN PATENT DOCUMENTS

JP        5-271718 A    10/1993
(Continued)

OTHER PUBLICATIONS

Kazuyuki Taji, "Io' u Riyo no shin Tenkai-Tai yoko o Riyo shite Ryuka Suiso kara Suiso o Tsukuru-", Sulphuric Acid and Industry, Jan. 15, 2002, vol. 55, No. 1, pp. 7 to 14.
(Continued)

Primary Examiner—Patricia L Hailey
(74) Attorney, Agent, or Firm—Sughrue Mion, PLLC

(57) ABSTRACT

A photocatalyst which has high catalytic activity, is nontoxic, has a long life, can utilize visible light as it is for photocatalytic reactions, and is useful especially for hydrogen generation; and a process for producing the same. The photocatalyst comprises cadmium sulfide, has a capsule structure, wherein platinum is supported thereto. It can be obtainable by bubbling $H_2S$ gas into a liquid to which particles of cadmium oxide have been added.

5 Claims, 3 Drawing Sheets

U.S. PATENT DOCUMENTS

| | | | | |
|---|---|---|---|---|
| 4,197,122 | A * | 4/1980 | Kawashima et al. | 430/94 |
| 4,204,933 | A * | 5/1980 | Barlow et al. | 438/72 |
| 4,242,374 | A * | 12/1980 | Sansregret | 427/76 |
| 4,366,222 | A * | 12/1982 | Feinleib | 430/127 |
| 4,427,749 | A * | 1/1984 | Graetzel et al. | 429/111 |
| 4,447,335 | A * | 5/1984 | Loeffler et al. | 252/1 |
| 4,461,753 | A * | 7/1984 | Suzuki et al. | 423/566.1 |
| 4,484,992 | A * | 11/1984 | Buhler et al. | 204/157.52 |
| 4,863,608 | A * | 9/1989 | Kawai et al. | 210/638 |
| 6,051,614 | A * | 4/2000 | Hirai et al. | 516/20 |
| 6,248,218 | B1 | 6/2001 | Linkous et al. | |
| 6,415,806 | B1 * | 7/2002 | Gillis | 135/124 |
| 6,524,997 | B1 * | 2/2003 | Higo et al. | 502/439 |
| 6,572,829 | B2 | 6/2003 | Linkous et al. | |
| 6,841,142 | B1 * | 1/2005 | Tenne et al. | 423/509 |
| 2005/0215421 | A1 | 9/2005 | Tohji et al. | |

FOREIGN PATENT DOCUMENTS

| | | |
|---|---|---|
| JP | 06-148172 A | 5/1994 |
| JP | 7-313884 A | 12/1995 |
| JP | 10-310401 A | 11/1998 |
| JP | 2000-051709 * | 2/2000 |
| JP | 2001-96169 A | 4/2001 |
| JP | 2001-157843 A | 6/2001 |
| JP | 2001-190964 A | 7/2001 |
| JP | 2001-239164 * | 9/2001 |

OTHER PUBLICATIONS

Kazuyuki Taji, "Stratified Hikari Shokubai o Mochiita Taiyoko ni yoru suiso no Seisei" Shingen Sozai, 2001, No. C/D, pp. 137 to 140.

Tatsuo Arai, "Stratified CdS Hikari Shokubai o Mochita Kashiko ni yoru Suiso Seisei", The mining and the Materials Processing Institute of Japan Shunki Taikai Koenshu, Mar. 28, 2002, No. 2. pp. 126 to 127.

Kazuyuki Taji, "Ekiteki Hyomen deno Stratified Keisei to sono Shokubai eno Oyo", 1998, vol. 68, No. 4, pp. 307 to 314.

Kozo Shinoda, et al., "Yoeki Kagaku Hanno o Riyo shita Kinzoku Ryukabutsu Handotai Hikari Shokubai no Sakusei to sono Tokusei", Shingen Sozai Gakkai Shunki Taikai Koenshu, Mar. 27, 2003, No. 2, pp. 132 to 133.

Machine English translation of JP 2001-096169.
Machine English translation of JP 10-310401.
Machine English translation of JP 2001-190964.
Machine English translation of JP 07-313884.

* cited by examiner

100nm

PHOTOCATALYST AND PROCESS FOR PRODUCING THE SAME

FIELD OF THE INVENTION

The present invention relates to a photocatalyst. More particularly, the invention relates to a photocatalyst which has high catalytic activity, is nontoxic, has a long life, can utilize visible light as it is for photocatalytic reactions, and is useful especially for hydrogen generation, etc., and to a process for producing the same.

BACKGROUND ART

To obtain chemical energy from solar energy, i.e., to utilize hydrogen energy, which is infinite and clean, is a dream of human beings. Energy issues in the 21st century and the global warming effect of carbon dioxide produced by fossil energy as well as environmental pollution including acid rain can be resolved by putting that energy into practical use.

The Honda-Fujishima effect published in A. Fujishima et. al., *Nature*, 238, 37(1972) was the first attempt which showed that water can be decomposed into oxygen and hydrogen with light energy. Thereafter, in the days when the oil crisis aroused questions all over the world, many investigations were actively made on techniques for converting light energy into chemical energy based on that principle. However, no improvement in the efficiency of light energy conversion in the visible light region has been made so far. A result of the active investigations made in the days of from 1980 to 1990 is that it was demonstrated that the electrons and holes generated by optical excitation recombine before reaching reaction sites for water decomposition and this recombination governs the efficiency of conversion. It was attempted to utilize an intercalation compound in order to separate reaction sites in view of that conclusion (S. Ikeda et. al., *J. Mater. Res.*, 13, 852(1998)). Although the efficiency of conversion has been gradually improved, a satisfactory conversion efficiency in the visible light region has not yet been attained. This is because complete separation of reaction sites, i.e., separation between electrons and holes, has not been attained.

Simultaneously with the investigations described above, investigations were made on a reaction system for yielding hydrogen by utilizing light absorption by ions in a solution. It was reported in J. Jortner, et. al., *J. Phys. Chem.*, 68, 247 (1964) and K. Hara, et. al., *J. Photochem. PhotoBiolo*. A128, 27 (1999) that hydrogen is yielded at a high quantum efficiency in an acidic solution containing iodine ions and in an alkali solution containing sulfur ions, respectively. However, all these reactions are possible with high-energy ultraviolet light having a wavelength of 250 nm or shorter.

On the other hand, since photocatalysts have the property of accelerating various chemical reactions such as, e.g., the decomposition of environmental pollutants, malodorous ingredients/various bacteria, or the like, they have come to be practically used in applications such as tiles having antibacterial activity and antibacterial/deodorizing filters for air cleaners. Furthermore, it is possible to cause a photocatalyst to act on a harmful substance to obtain a useful chemical substance therefrom. For example, photocatalysts are expected to be applied to a crude oil desulfurization step.

In the step of desulfurizing crude oil which is generally conducted presently, heavy naphtha is subjected to hydrofining during crude oil distillation to recover all the sulfur ingredients contained in the crude oil as hydrogen sulfide. This hydrogen sulfide is recovered after oxidation of sulfur through the process called Claus process. The Claus process is a process in which one-third of the hydrogen sulfide is oxidized into sulfurous acid gas and this gas is reacted with the remaining hydrogen sulfide to obtain elemental sulfur.

This process necessitates an enormous amount of energy because of not only the catalytic reaction of sulfurous acid gas with hydrogen sulfide but also repetitions of heating and condensation. It further has problems, for example, that the management of sulfurous acid gas is costly.

If a method which comprises adding a photocatalyst to an aqueous alkali solution containing hydrogen sulfide dissolved therein, irradiating the resultant mixture with light to thereby cause the photocatalyst to absorb the light energy of the radiation and generate free electrons and free holes, and oxidizing/reducing the aqueous alkali solution containing dissolved hydrogen sulfide by the free electrons and holes to obtain hydrogen and sulfur, i.e., a method for decomposing hydrogen sulfide with a photocatalyst to yield hydrogen and sulfur, can be put to practical use, it becomes possible to decompose hydrogen sulfide as a harmful substance with a smaller amount of energy to produce hydrogen and sulfur as useful substances. Namely, this technique contributes to the resolution of environmental problems and enables the useful substances to be produced at low cost.

However, the photocatalysts proposed so far have had the following problems which should be overcome. First, the catalytic activity is low. Secondary, the photocatalysts are toxic. Although the photocatalysts generate free electrons and free holes upon irradiation with light, the probability that the free electrons recombine with the free holes is high. Furthermore, the probability that chemical substances formed through decomposition by oxidation/reduction reactions recombine with each other and return to the original compound is also high. Because of these, the catalytic activity is low.

Thirdly, the catalysts have a short life. The prior-art photocatalysts have the following problem concerning photodissolution. Although the photocatalysts generate free electrons and free holes upon irradiation with light, the catalysts themselves are oxidized/reduced besides the target chemical substance because of the high susceptibility to oxidation/reduction reactions of these electrons and holes. The catalysts thus dissolve away and are deprived of their catalytic activity.

For overcoming these problems, JP-A-2001-190964 disclosed a photocatalyst having high catalytic activity, no toxicity, and a long life. Thus, the three problems described above were eliminated.

However, the photocatalyst disclosed in JP-A-2001-190964 is limited to one comprising ZnS. Since the band gap for ZnS is in the ultraviolet region, it has been impossible to utilize visible light such as, e.g., sunlight, which is infinite clean energy, as it is for photocatalytic reactions.

DISCLOSURE OF THE INVENTION

Accordingly, an object of the invention is to overcome the drawbacks of the related-art techniques described above and provide a photocatalyst which has high catalytic activity, is nontoxic, has a long life, can utilize visible light as it is for photocatalytic reactions, and is useful especially for hydrogen generation. Another object of the invention is to provide a process for producing the photocatalyst.

As a result of intensive investigations, the present inventors have succeeded in eliminating those problems by employing the following constitutions.

Namely, the invention is as follows.

(1) A photocatalyst which comprises cadmium sulfide, has a capsule structure, wherein platinum is supported thereto.

(2) A process for producing a photocatalyst, which comprises bubbling $H_2S$ gas into a liquid to which particles of cadmium oxide have been added.

(3) The process according to the above (2), which comprises supporting platinum thereafter.

Since the photocatalyst of the invention comprises cadmium sulfide, visible light such as, e.g., sunlight, which is an infinite clean natural energy, can be utilized as it is for reactions catalyzed by the photocatalyst. In addition, the photocatalyst is nontoxic and has a long life.

The photocatalysts of the related art which comprise simple particles of cadmium sulfide have had an exceedingly low efficiency of light energy conversion.

In contrast, the photocatalyst of the invention has a capsule structure which comprises a shell comprising cadmium sulfide and has a void. The following is thought. In this capsule shell comprising cadmium sulfide, an electric field is present between the outer side and inner side of the shell. Because of this, the recombination of free electrons generated by irradiation with visible light, e.g., sunlight, with free holes simultaneously generated by the irradiation is diminished and the recombination of oxidation reaction products with reduction reaction products is also diminished. High catalytic activity can hence be obtained.

By the mechanism described above, the photocatalyst of the invention can be one which has high catalytic activity, is nontoxic, has a long life, and can utilize visible light as it is for photocatalytic reactions and which is useful especially for hydrogen generation.

The photocatalyst of the invention will be explained below in detail.

The average particle diameter of the photocatalyst of the invention, which has a capsule structure, is not particularly limited. However, it may be about 250 nm.

Incidentally, the average particle diameter of the photocatalyst of the invention, which has a capsule structure, is determined by taking some electron photomicrographs of from several to tens of catalyst particles, measuring the length of the major axis of each particle image on the photographs, and averaging the found values.

In the photocatalyst of the invention, platinum is supported thereto for the purposes of further enhancing its photocatalytic activity and securing hydrogen generation sites.

The structure of the photocatalyst of the invention will be explained below.

The photocatalyst according to the invention has a shell comprising a cadmium sulfide compound and a void. The shell of the photocatalyst of the invention has a stratified structure comprising a layer of ultrafine cadmium sulfide compound particles having a particle diameter of from 1 nm to 10 nm. Photocatalysts such as that of the invention are called stratified photocatalysts. Furthermore, the shell having a stratified structure of the photocatalyst of the invention has a possibility that it might have a structure in which the proportion of cadmium (Cd) element to sulfur element changes in the layer thickness direction. It is thought that an electric field is hence present in the layer thickness direction and this diminishes the recombination of free electrons generated by irradiation with visible light, e.g., sunlight, with free holes simultaneously generated by the irradiation and the recombination of oxidation reaction products with reduction reaction products to thereby give high catalytic activity.

FIG. 1 is a transmission electron photomicrograph of a stratified material comprising fine cadmium sulfide compound particles which is one embodiment of the photocatalyst of the invention; the photomicrograph was taken with irradiation with electron beams.

It can be seen from the photograph that the stratified material has a capsule structure constituted of ultrafine CdS particles of several nanometers.

Processes for producing the photocatalyst of the invention are not particularly limited. However, the simplest process is as follows.

$H_2S$ gas is bubbled into a liquid to which particles of cadmium oxide (CdO) having no photocatalytic activity have been added, and the mixture is then allowed to stand. As a result, ultrafine particles of cadmium sulfide (CdS) are formed on the surface of the cadmium oxide (CdO) particles. In this operation, cadmium oxide (CdO) is consumed and this cadmium ingredient forms a layer of ultrafine particles of cadmium sulfide (CdS). This layer formation occurs from the surface of the CdO particles. Because of this, the cadmium oxide (CdO) present inside the capsule structure is dissolved away. The photocatalyst of the invention hence has a stratified capsule structure having a void inside.

After formation of the photocatalyst having this stratified capsule structure, platinum serving as hydrogen generation sites is supported thereto by deposition from, e.g., a solution of chloroplatinic acid.

The cadmium oxide particles having no photocatalytic activity to be used in the production process described above may be commercial ones, or may be ones suitably produced.

The particle diameter of the photocatalyst to be produced can be suitably regulated according to the intended use of the catalysis thereof. Examples of methods for regulating the particle diameter thereof include one in which the particle diameter of the cadmium oxide particles having no photocatalytic activity is regulated.

BEST MODE FOR CARRYING OUT THE INVENTION

The invention will be explained below in more detail by reference to Examples, but the scope of the invention should not, of course, be construed as being limited by these.

(Photocatalyst Production)

One gram of commercial reagent CdO (manufactured by Kojundo Chemical Co., Ltd.; particle diameter, 200-300 nm) was added to 50 mL of distilled water. $H_2S$ gas was bubbled into the mixture with stirring at a flow rate of about 50 mL/min for 1 hour. Thereafter, the mixture was allowed to stand for 24 hours and subjected to solid-liquid separation. The solid matter obtained was subjected to an acid treatment with hydrochloric acid and a washing treatment with distilled water and then to a solid-liquid separation. A 250-mg portion of the solid matter obtained was added to 100 mL of 0.965 mM chloroplatinic acid solution. This mixture was irradiated, with stirring, with ultraviolet light for 5 minutes using a mercury lamp, and then subjected to solid-liquid separation.

Figure 1:
FIG. 1 is an electron photomicrograph showing the structure of a photocatalyst of the invention.

The solid matter obtained was examined with a transmission electron microscope, TEM. As a result, the structure shown in the TEM photograph of FIG. 1 was ascertained.

<Evaluation of the Photocatalyst>

The amount of hydrogen generated with the photocatalyst particles obtained above was measured by the following test method.

(Test Method for Measuring Amount of Hydrogen Generated)

A hundred milligrams of photocatalyst particles are introduced into an apparatus for measuring the amount of hydrogen generated which is constituted of a buret and other components. Subsequently, 140 mL of 0.1 M sodium sulfide solution is introduced into the apparatus for measuring the amount of hydrogen generated.

The apparatus is irradiated from under the same with an artificial sunlight using a 450-W xenon lamp manufactured by Wakomu Denso K.K., and the amount of hydrogen generated in every unit time period is measured.

For the purpose of comparison, commercial CdS particles (manufactured by Wako Pure Chemical Industries, Ltd.; particle diameter, 0.3 μm) which neither had the stratified capsule structure in the invention nor had platinum were used under the same conditions in a comparative experimental example.

Figure 2:
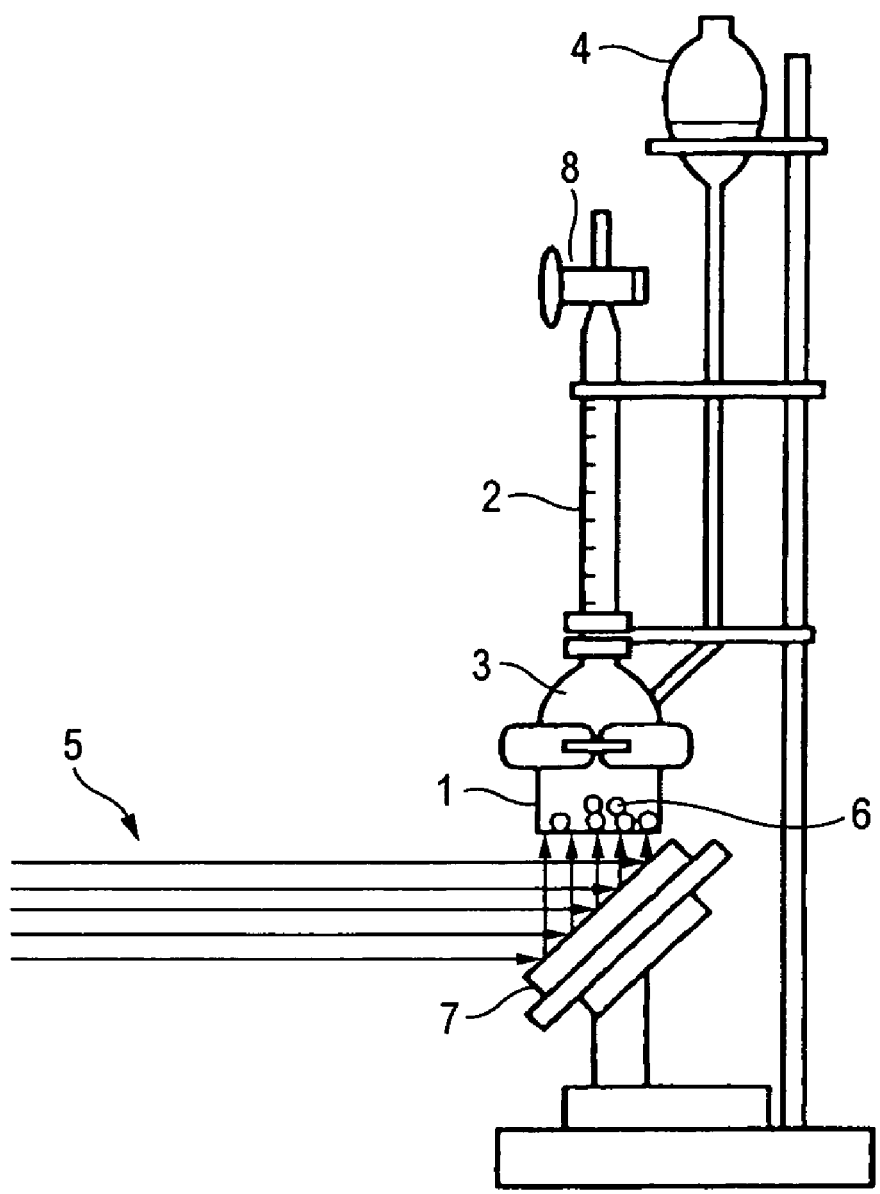
FIG. 2 is a view showing the constitution of the apparatus used for measuring the amount of hydrogen generated.

FIG. 2 illustrates the apparatus used for the measurement of the amount of hydrogen generated. As shown in FIG. 2, this apparatus is constituted of: a photoreaction part 1 made of quartz glass; a hydrogen determination part 2 for determining the hydrogen generated; a solution reservoir 4 into which an aqueous sodium sulfide solution 3 comes in an amount corresponding to the volume of the hydrogen gas generated to thereby prevent an increase in hydrogen pressure; a 450-W xenon lamp (not shown) for irradiation with an artificial sunlight 5; and a reflecting mirror 7 for reflecting the artificial sunlight 5 to irradiate a photocatalyst 6. Prior to the initiation of a photodecomposition reaction, the whole system is filled with an aqueous sodium sulfide solution 3 and a given amount of the photocatalyst 6 is sedimented on the bottom of the photoreaction part 1. The opening 8 for recovering gas generated is closed, and the 450-W xenon lamp is switched on. The amount of the hydrogen generated is measured in the hydrogen determination part 2 at a given interval of irradiation time.

<Results of the Test for Measuring Amount of Hydrogen Generated>

Figure 3:
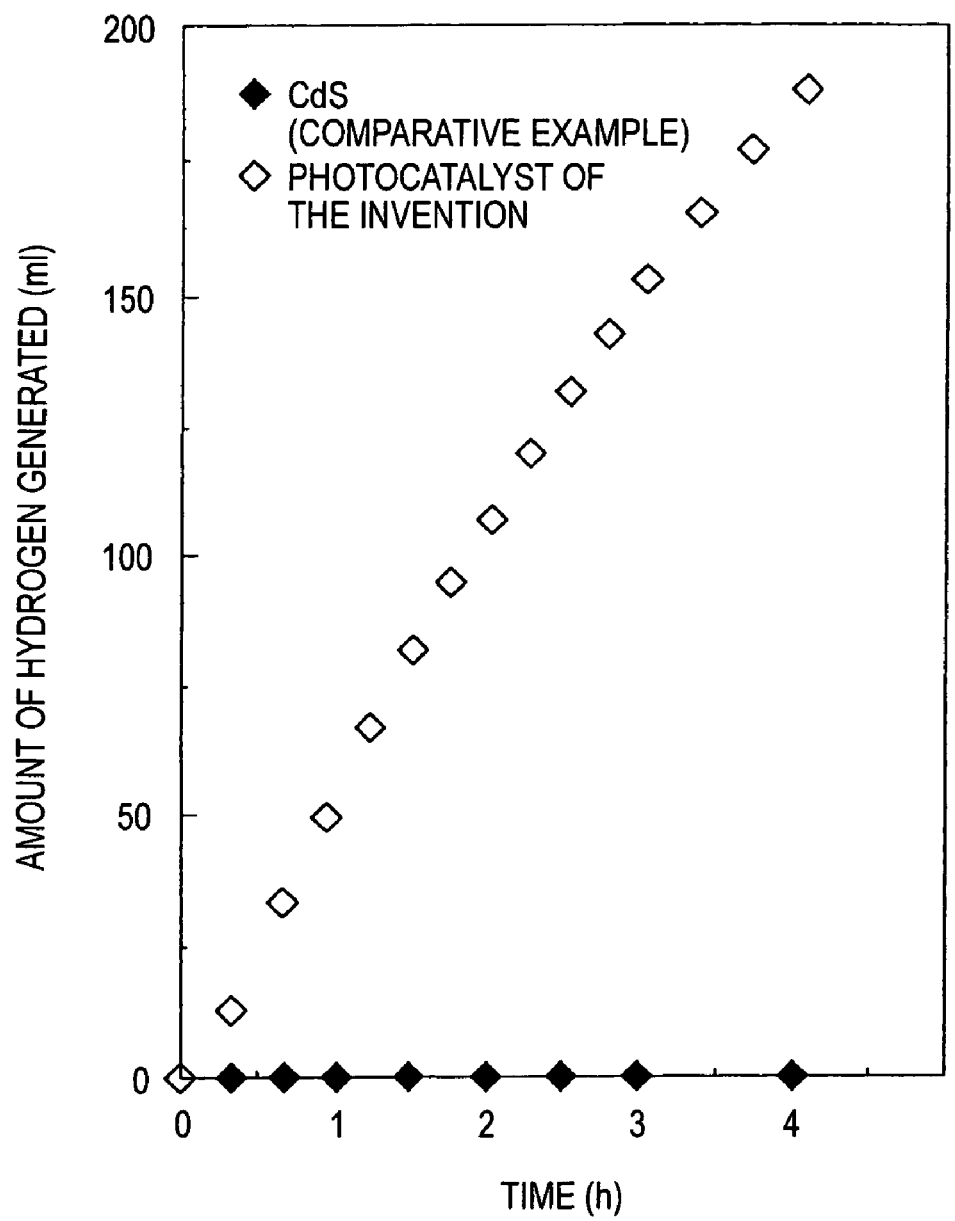
FIG. 3 is an illustration showing a comparison between a photocatalyst of the invention and an existing photocatalyst in hydrogen generation performance.

FIG. 3 shows the dependence of the amount of hydrogen generated on the visible light irradiation time. As apparent from the graphs showing a comparison in this performance, the photocatalyst of Example according to the invention gave satisfactory results with a hydrogen generation rate of about 50 mL/h as apparent from FIG. 3. In contrast, the test for measuring the amount of hydrogen generated with the CdS particles of Comparative Example gave unsatisfactory results.

Furthermore, actual sunlight was used to conduct the same experiment. As a result, the following experimental results were obtained. Sunlight was condensed with a lens, reflected with the mirror, and caused to strike on the reaction vessel from under the same. The quality of the sunlight measured with a power meter was 14 Wh. The amount of the hydrogen thus generated was about 70 mL/h. The intensity of direct sunlight was simultaneously measured and was found to be 0.23 $W/3.14\ cm^2$. These results of the measurements mean that about 3.5 L of hydrogen is obtained per hour with sunlight incident on 1 $m^2$.

INDUSTRIAL APPLICABILITY

It can be understood from the explanation given above that the photocatalyst of the invention has high catalytic activity, is nontoxic, can utilize visible light as it is for photocatalytic reactions, and is useful for hydrogen generation, etc.

The invention claimed is:

1. A process for producing a photocatalyst which comprises a capsule structure comprising a cadmium compound shell and a void, said process comprises bubbling $H_2S$ gas into a liquid to which particles of cadmium oxide have been added.

2. The process according to claim 1, which comprises supporting platinum thereafter.

3. The process of claim 1, wherein the capsule structure comprises a cadmium compound shell and a void inside said shell.

4. A photocatalyst which comprises (i) a capsule structure comprising a cadmium compound shell and an internal void in direct communication with an inside surface of said cadmium compound shell, and (ii) platinum supported on an outside surface of said shell.

5. The photocatalyst of claim 4, wherein said cadmium compound shell has a stratified structure.

\* \* \* \* \*